(12) United States Patent
Minami

(10) Patent No.: US 6,742,331 B2
(45) Date of Patent: Jun. 1, 2004

(54) DEVICE FOR PURIFYING EXHAUST GAS OF DIESEL ENGINES

(75) Inventor: Toshitaka Minami, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 108 days.

(21) Appl. No.: 10/173,777

(22) Filed: Jun. 19, 2002

(65) Prior Publication Data
US 2002/0194842 A1 Dec. 26, 2002

(30) Foreign Application Priority Data
Jun. 20, 2001 (JP) ........................................ 2001-186474

(51) Int. Cl.[7] ................................................ F01N 3/00
(52) U.S. Cl. ............................ 60/287; 60/288; 60/297; 60/311
(58) Field of Search ......................... 60/272, 287, 288, 60/297, 311, 295

(56) References Cited

U.S. PATENT DOCUMENTS

| | | | |
|---|---|---|---|
| 4,211,075 A | | 7/1980 | Ludecke et al. |
| 4,562,695 A | * | 1/1986 | Rao et al. ..................... 60/286 |
| 4,835,963 A | | 6/1989 | Hardy |
| 5,063,736 A | * | 11/1991 | Hough et al. ................. 60/286 |
| 5,067,320 A | * | 11/1991 | Kanesaki ...................... 60/297 |
| 5,085,049 A | | 2/1992 | Rim et al. |
| 5,097,665 A | * | 3/1992 | Kammel ....................... 60/275 |
| 5,195,318 A | * | 3/1993 | Shinzawa et al. ............. 60/285 |
| 5,433,074 A | | 7/1995 | Seto et al. |
| 5,489,319 A | * | 2/1996 | Tokuda et al. ................ 96/400 |
| 5,497,620 A | | 3/1996 | Stobbe |

FOREIGN PATENT DOCUMENTS

JP  6-108884  4/1994

* cited by examiner

Primary Examiner—Thomas Denion
Assistant Examiner—Diem Tran

(57) ABSTRACT

A device for purifying exhaust gas of a diesel engine includes a first continuous regeneration type diesel particulate filter (DPF) disposed in the exhaust gas passage of the engine, a second continuous regeneration type DPF having a capacity smaller than the capacity of the first continuous regeneration type DPF and disposed in the exhaust gas passage on the upstream side of the first continuous regeneration type DPF, a by-path surrounding the outer peripheral portion of the second continuous regeneration type DPF, a control valve for opening and closing the by-path, an exhaust gas temperature region-detector for detecting the exhaust gas temperature region of the engine, and a controller for controlling the control valve so as to close the by-path when the exhaust gas temperature region of the engine is in a low temperature region, lower than a predetermined temperature.

2 Claims, 5 Drawing Sheets

MAP OF EXHAUST GAS TEMP. REGIONS

DEVICE FOR PURIFYING EXHAUST GAS OF DIESEL ENGINES

FIELD OF THE INVENTION

The present invention relates to a device for purifying exhaust gas by removing particulate matters contained in the exhaust gas from diesel engines.

DESCRIPTION OF THE RELATED ART

Regulations are now becoming stringent year after year against the exhaust gases emitted from internal combustion engines, and particularly from diesel engines. In particular, it is becoming an urgent task to reduce particulate matters (hereinafter referred to as PMs) which chiefly comprise carbon. As a device for removing PMs from the exhaust gas, there has been known a diesel particulate filter (hereinafter referred to as DPF). The trend toward obligatorily furnishing diesel engine-mounted vehicles with a DPF is now becoming serious.

However, the DPFs with which diesel engine-mounted vehicles are furnished must be regenerated by burning the trapped PMs because the trapped PMs are deposited thereon due to repetitive operation of the engine. As a means of regeneration, there is known system in which the PMs are burned by heating them, using an electric heater or a burner. When a system that burns the PMs is employed, the PMs cannot be trapped while the DPF is under regeneration. Therefore, a system is used in which a plurality of DPFs are arranged in parallel in the exhaust gas passage and the trapping and burning are conducted alternately. This system, however, creates a problem in that a device large in scale is required. Further, systems which burn PMs have another problem of how to secure durability of the filter, since the PMs are burned at a high temperature.

Because of these reasons, systems which burn trapped PMs have not been widely employed.

As another means for trapping and regenerating PMs, for example, Japanese Patent No. 3012249 discloses a so-called continuous regeneration type DPF in which an oxidizing catalyst is disposed in the exhaust gas passage on the upstream side of the DPF, NO in the exhaust gas is oxidized into $NO_2$ by the oxidizing catalyst, and the trapped PMs are continuously burned with $NO_2$ while continuing the trapping of PMs. There has further been proposed another continuous regeneration type DPF for achieving the same operation effect, in which the oxidizing catalyst is directly carried on the DPF.

As a further continuous regeneration type DPF, Japanese Patent No. 2600492 teaches a system according to which the DPF carries an NOx occluding/reducing catalyst, and the trapped PMs are continuously burned by utilizing active oxygen that generates when the NOx is occluded and reduced.

In any one of these continuous regeneration type DPFs utilizing the action of the catalyst, however, it has been well known that the exhaust gas must have a predetermined temperature to continuously regenerate the DPF while trapping the PMs. When the engine is idling or is in a low-load operation state in particular, the exhaust gas has a low temperature and flows at a low flow rate. Therefore, the temperature drops before the exhaust gas arrives at the continuous regeneration type DPF, making it difficult to continue the regeneration operation while trapping the PMs to a sufficient degree.

As described above, the continuous regeneration type DPF for diesel engines has a problem in that the trapped PMs cannot be continuously regenerated when the temperature is too low. In order that the temperature of the exhaust gas flowing into the continuous regeneration type DPF will not become low, it can be contrived to arrange the continuous regeneration type DPF close to the engine. However, since there is only limited space in the engine compartment, it is difficult to mount, in the engine compartment, a continuous regeneration type DPF of a large capacity which is designed by taking the amount of trapping the PMs and the flow resistance of the exhaust gas into consideration. It is therefore necessary to mount the continuous regeneration type DPF at a position remote from the engine.

Further, even if the continuous regeneration type DPF of a large capacity could be disposed close to the engine, the exhaust gas becomes cool in the continuous regeneration type DPF of the large capacity if the operation condition continues in a state where the exhaust gas has a low temperature and flows at a low flow rate. Therefore, it becomes difficult to continuously and completely burn the trapped PMs, whereby the PMs locally remain unburned.

In view of the above-mentioned problems, the present applicant has proposed in Japanese Patent Application No. 2001-155894 a device for purifying exhaust gas of a diesel engine comprising a first continuous regeneration type DPF having a large capacity on the downstream side of the exhaust gas passage, a by-path by-passing a portion of the exhaust gas passage on the upstream side of the exhaust gas passage, i.e., at a position close to the engine (e.g., just behind the exhaust manifold), a second continuous regeneration type DPF of a small capacity disposed in the by-path, and a control valve in the exhaust gas passage in parallel with the by-path to open and close the passage, wherein the control valve is closed in a temperature region where the exhaust gas has a low temperature while the engine is in operation, so that the exhaust gas flows into the second continuous regeneration type DPF in the by-path.

According to the above-mentioned device for purifying exhaust gas of a diesel engine, when the temperature of the exhaust gas is low, the exhaust gas is permitted to flow into the second continuous regeneration type DPF which is disposed immediately after the engine and has a capacity smaller than that of the first continuous regeneration type DPF that has a large capacity to cope with the case when the exhaust gas is emitted at a large flow rate, solving the problem in that the exhaust gas is cooled in the exhaust gas passage and in the first DPF.

Here, the continuous regeneration type DPF has a characteristic feature in that the PMs are continuously oxidized and burned to regenerate the DPF while trapping the PMs, and, hence, the PMs do not accumulate in the DPF. It is, therefore, important that the PMs be oxidized and burned in amounts larger than the amounts of PMs trapped by the DPF. However, when the efficiency for oxidizing and burning the PMs changes depending upon the temperature conditions and the like of the exhaust gas, and as a result the amount of the trapped PMs becomes greater than the amount of the PMs that can be oxidized and burned, the PMs start to deposit on the DPF, and the deposited PMs become difficult to be oxidized and burned easily. Particularly, in the continuous regeneration type DPF carrying the catalyst directly on the DPF, the reaction itself of the catalyst lowers. Once the PMs are deposited, therefore, the function of the DPF is not easily recovered. Further, if deposited in increased amounts, then, the PMs ignite when the temperature of the exhaust gas becomes high, whereby the temperature is quickly raised, causing the DPF to be melt-damaged. It is therefore desired that the PMs be deposited in smaller amounts on the DPF so as always to maintain the DPF in a fresh state as much as possible.

In the device for purifying exhaust gas of diesel engines taught in the above-mentioned prior application, the second continuous regeneration type DPF of a small capacity, arranged at a position close to the engine, works to trap the PMs and to continuously regenerate the DPF under the operation condition where the temperature of the exhaust gas is low, and efficiently purifies the exhaust gas. Meanwhile, in other operation conditions, the control valve is opened, the exhaust gas does not flow into the second continuous regeneration type DPF but flows, passing through the exhaust gas passage, into the first continuous regeneration type DPF where the PMs are trapped while the DPF is continuously regenerated. That is, the second continuous regeneration type DPF is not used under the above-mentioned operation conditions. Therefore, the second continuous regeneration type DPF that is not being used may be cooled down to a considerably low temperature due to the external air and the like. When the exhaust gas passage is changed over to the second continuous regeneration type DPF in this state, the oxidizing reaction of the catalyst is not sufficiently conducted, and the PMs are not satisfactorily oxidized and burned.

SUMMARY OF THE INVENTION

In a device for purifying exhaust gas of diesel engines comprising a first continuous regeneration type diesel particulate filter arranged in the exhaust gas passage of the engine, and a second continuous regeneration type diesel particulate filter arranged in the exhaust gas passage on the upstream side of the first continuous regeneration type diesel particulate filter, it is an object of the present invention to constitute the above device so as to allow the second continuous regeneration type DPF to be always maintained in a fresh state where no PMs are deposited and to enable the oxidizing reaction of the catalyst and the continuous regeneration of the DPF to be quickly executed without problem when the exhaust gas passage is changed over to the second continuous regeneration type DPF.

In order to accomplish the above-mentioned object according to the present invention, there is provided a device for purifying exhaust gas of diesel engines having a continuous regeneration type diesel particulate filter arranged in the exhaust gas passage of the engine, which comprises a first continuous regeneration type diesel particulate filter arranged in the exhaust gas passage of the engine, a second continuous regeneration type diesel particulate filter having a capacity smaller than the capacity of the first continuous regeneration type diesel particulate filter and disposed in the exhaust gas passage on the upstream side of the first continuous regeneration type diesel particulate filter, a by-path arranged to surround the outer peripheral portion of the second continuous regeneration type diesel particulate filter, a control valve for opening and closing the by-path, an exhaust gas temperature region-detecting means for detecting the exhaust gas temperature region of the engine, and a control means for so controlling the control valve as to close the by-path when the exhaust gas temperature region of the engine detected by the exhaust gas temperature region-detecting means is in a low temperature region lower than a predetermined temperature.

DETAILED DESCRIPTION OF THE PREFERRED EMBODIMENTS

Preferred embodiments of the present invention will now be described in detail with reference to the drawings.

Figure 1:
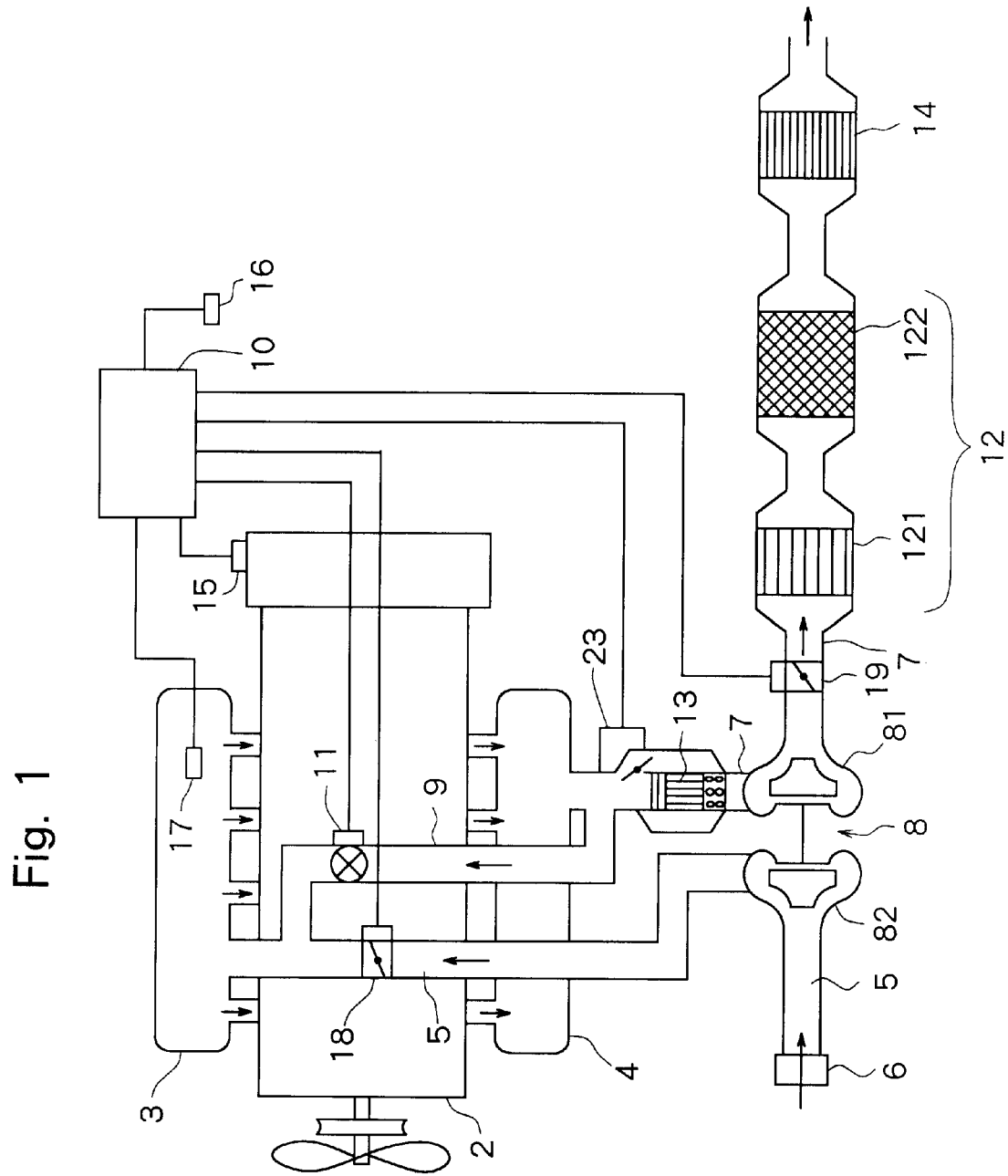
FIG. 1 is a block diagram illustrating a device for purifying exhaust gas of a diesel engine mounting a continuous regeneration type diesel particulate filter according to the present invention.

On an engine body 2 comprising a cylinder block, a cylinder head and the like shown in FIG. 1, there are arranged an intake manifold 3, constituting part of the intake air passage, and an exhaust gas manifold 4, constituting part of the exhaust gas passage. An intake pipe 5 constituting part of the intake air passage is connected to the intake manifold 3, and an air cleaner 6 for cleaning the intake air is disposed in the most upstream portion of the intake pipe 5. The intake air cleaned through the air cleaner 6 passes through the intake pipe 5 and is fed into a cylinder 1, shown in FIG. 4, via the intake manifold 3. An exhaust pipe 7, constituting part of the exhaust gas passage, is connected to the exhaust gas manifold 4, and the exhaust gas formed in the cylinder is emitted out through the exhaust manifold 4 and the exhaust pipe 7.

The diesel engine illustrated is equipped with a turbo charger 8 for supercharging the intake air. The turbo charger 8 has an exhaust turbine 81 arranged in the exhaust pipe 7 and an intake compressor 82 arranged in the intake pipe 5. Further, the illustrated diesel engine has an exhaust gas recirculation (hereinafter referred to as EGR) passage 9 communicating the exhaust pipe 7 on the upstream side of the exhaust turbine 81 with the intake pipe 5 on the down stream side of the intake compressor 82. An EGR valve 11 is arranged in the EGR passage 9. The EGR valve 11 is equipped, for example, with a negative pressure actuator connected to a negative pressure tank that is not shown, and the amount of negative pressure supplied thereto is controlled by a control means 10 that will be described later, according to the operating conditions, whereby the opening degree or EGR ratio of the EGR valve 11 is controlled. As is well known, the EGR is an exhaust gas-purifying means for suppressing NOx by feeding intake air, into which the exhaust gas after burning has been recirculated, into the cylinder. In the illustrated embodiment, the EGR passage and the engine side are communicated through the intake pipe and the exhaust pipe. It is obvious, however, that the intake pipe and the exhaust pipe may be replaced by the intake manifold constituting part of the intake air passage and the exhaust manifold, respectively.

In the exhaust pipe 7 on the downstream side of the exhaust gas turbine 81, there are arranged a first continuous regeneration type diesel particulate filter 12 having an oxidizing catalyst 121 and a DPF 122 in this order from the upstream side, and a NOx catalyst 14. The oxidizing catalyst 121 is obtained by coating the surfaces of a carrier made of, for example, honeycomb-like cordierite or a heat-resistant steel with active alumina to form a wash coat layer, and carrying a catalytically active component formed of a novel metal such as platinum, palladium or rhodium on the coated layer. The oxidizing catalyst 121 oxidizes NO in the exhaust gas to form $NO_2$ and further, oxidizes HC and CO in the exhaust gas to form $H_2O$ and $CO_2$. The DPF 122 is a honeycomb filter of a so-called wall-flow type in which a number of cells are formed in parallel by using, for example, porous cordierite or silicon carbide, the inlets and outlets of the cells being alternately closed, or is a fiber-type filter obtained by winding ceramic fibers in many layers on a porous stainless steel pipe to trap PMs contained in the exhaust gas. The NOx catalyst 14 has the same constitution and components as those used for the oxidizing catalyst 121, and works to reduce NO such as NOx or the like in the exhaust gas into $N_2$ and $H_2O$. Thus, the continuous regeneration type DPF 12 is constituted by at least the above-mentioned oxidizing catalyst 121 and the DPF 122, and NO in the exhaust gas is oxidized into $NO_2$ by the oxidizing catalyst 121, and the trapped PMs are burned by using $NO_2$ that flows into the DPF 122 arranged on the down stream side of the oxidizing catalyst 121. The PMs burn in a low temperature region of from 250° C. to 400° C. Therefore, there is no need of providing any particular heating means such as an electric heater or a burner. Besides, the device as a whole is simply and compactly constructed since the PMs are continuously burned at low temperatures while continuing the trapping of PMs. In the continuous regeneration type DPF of this embodiment, the oxidizing reaction of the oxidizing catalyst drops as the temperature exceeds 400° C. and hence, it is desired that the exhaust gas passing through the DPF be maintained at temperatures of not higher than 400° C.

In the device for purifying exhaust gas of a diesel engine according to the present invention, a second continuous regeneration type DPF 13 is arranged in the exhaust gas passage on the upstream side of the first continuous regeneration type DPF.

The constitution of the second continuous regeneration type DPF 13 and of the exhaust gas passage will be described with reference to FIGS. 2A and 2B. The second continuous regeneration type DPF 13 constituted by an oxidizing catalyst 131 on the upstream side and a DPF 132 on the downstream side, is arranged in an exhaust pipe section 7c between an exhaust pipe section 7a and an exhaust pipe section 7b which form the exhaust gas passage. A by-path 20 is provided surrounding the outer peripheral portion of the second continuous regeneration type DPF, and is connected, through a communication passage 21, to the exhaust pipe section 7a on the upstream side of the second continuous regeneration type DPF 13.

A control valve 22 is provided in the communication passage 21 to open and close the communication passage 21 and is driven by an actuator 23 which is operated in response to a control signal from control means 10.

An opening portion 24 for communicating the by-path 20 with the exhaust pipe section 7b is provided on the downstream side of the exhaust pipe section 7c that holds the second continuous regeneration type DPF. The exhaust gas passing through the by-path 20 flows into the exhaust pipe section 7b, on the downstream side, through the opening portion 24. The communication passage 21 and the opening portion 24 are formed large enough so as not to create flow resistance when the flow rate of the exhaust gas from the engine becomes a maximum.

Figure 2A:
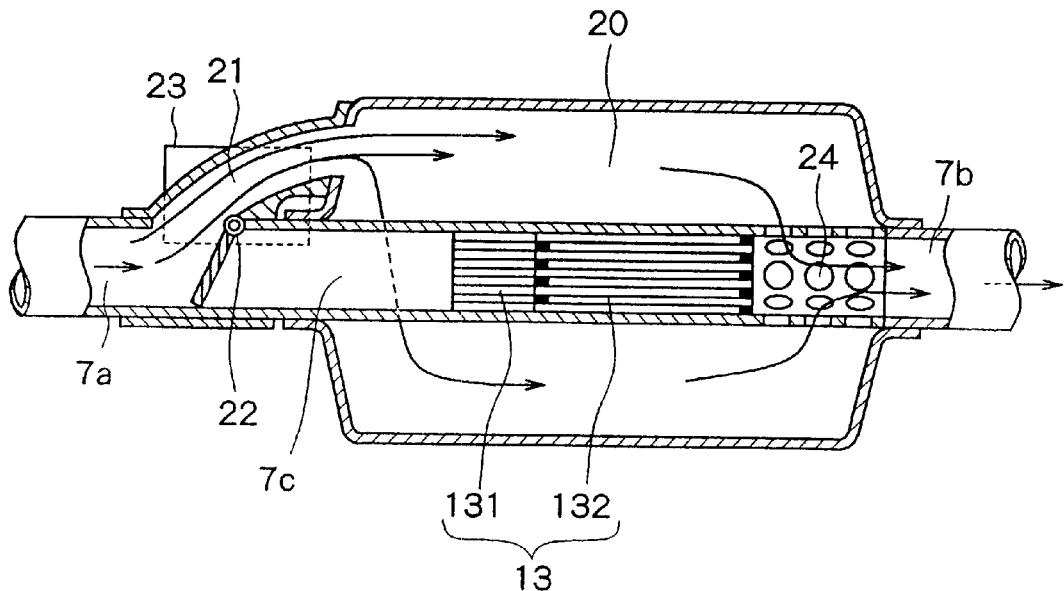
FIGS. 2A and 2B are sectional views illustrating operating states of an embodiment of a continuous regeneration type diesel particulate filter for a diesel engine according to the present invention.

FIG. 2A illustrates a state where the control valve 22 opens the communication passage 21 to allow the exhaust pipe section 7a on the inlet side to be communicated with the by-path 20. The control valve 22 works as a change-over valve which enables the by-path 20 to be communicated with the exhaust pipe portion 7a on the inlet side while preventing the exhaust gas from flowing into the exhaust pipe section 7c which is communicated with the second continuous regeneration type DPF side. In this state, the exhaust gas emitted from the exhaust manifold all flows through the by-path 20.

Figure 2B:
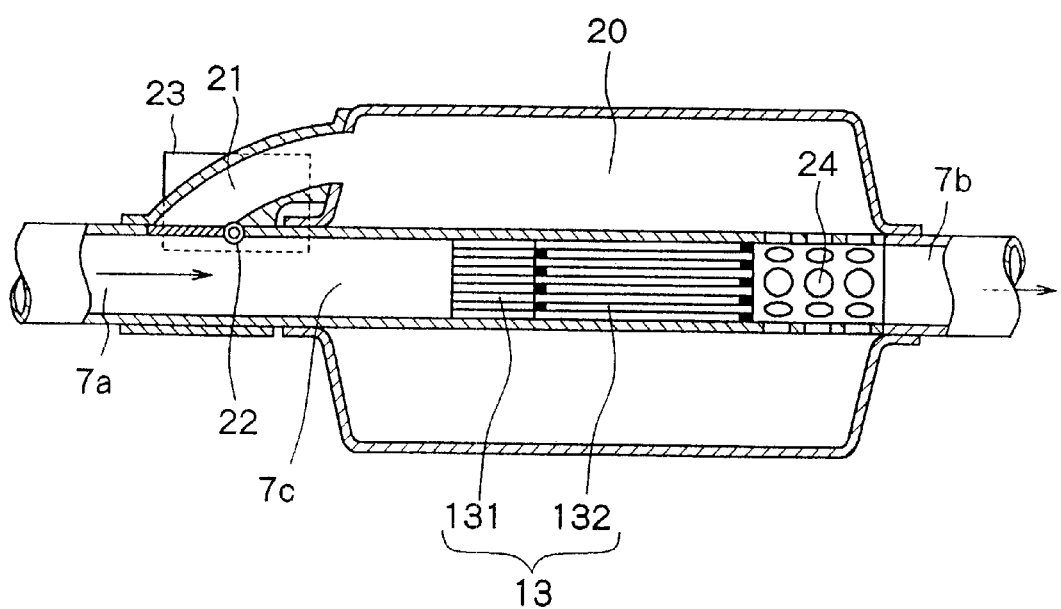

FIG. 2B illustrates a state where the control valve 22 is changed over to close the communication passage 21 between the exhaust pipe section 7a on the inlet side and the by-path 20. In this state, the exhaust gas all flows into the second continuous regeneration type DPF through the exhaust pipe section 7c, and the PMs are trapped and burned in the second continuous regeneration type DPF.

In the embodiment shown in FIGS. 2A and 2B as described above, when the exhaust gas has a low temperature and flows at a small flow rate, as at the time of low load operation, the by-path 20 is closed by the control valve 22, causing the exhaust gas to flow into the second continuous regeneration type DPF 13 of a small capacity. When the exhaust gas has a high temperature and flows at a large flow rate, as at the time of the high-load operation, the control valve 22 is opened, causing the exhaust gas to flow into the by-path 20 surrounding the outer periphery of the second continuous regeneration type DPF, so that while the second continuous regeneration type DPF is heated from the surrounding exhaust gas flow, the PMs are trapped and burned by using the first continuous regeneration type DPF without using the second continuous regeneration type DPF.

Figure 3A:
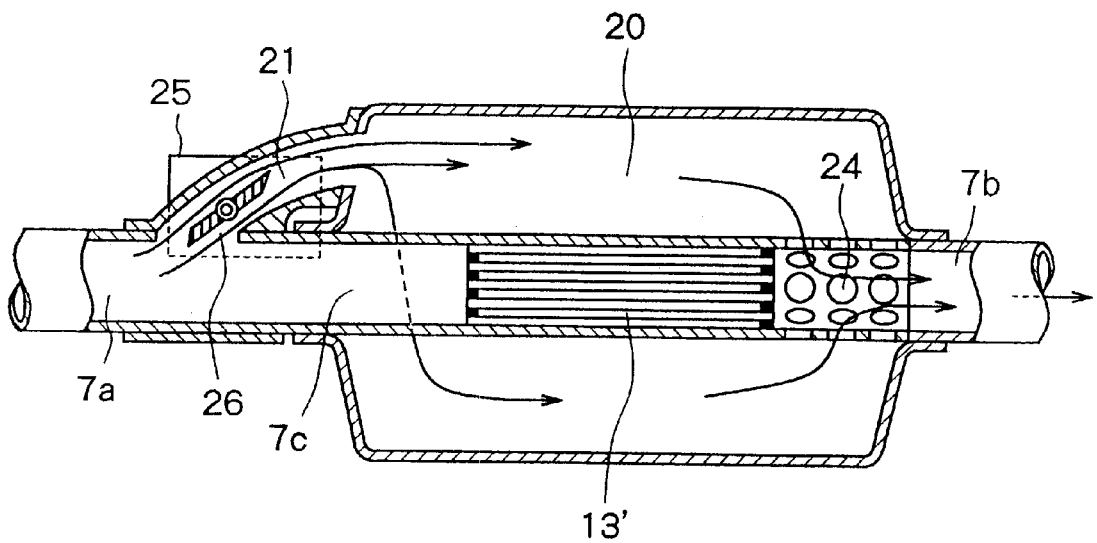
FIGS. 3A and 3B are is a sectional views illustrating operating states of another embodiment of a continuous regeneration type diesel particulate filter for a diesel engine according to the present invention.

Next, another embodiment of the control valve for opening and closing the by-path 20 will be described with reference to FIGS. 3A and 3B. In the embodiment shown in FIGS. 3A and 3B, the same members as those of the embodiment of FIGS. 2A and 2B are denoted by the same reference numerals, and are not described here again. In the embodiment shown in FIGS. 3A and 3B, the second continuous regeneration type DPF 13' carries a catalyst directly on a DPF filter and contains a component that works to oxidize and burn the PMs even in a high exhaust gas temperature region (not lower than 400° C.). A control valve 26 driven by an actuator 25 does not work as a change-over valve for changing over the communication on the side of the by-path 20 to the passage on the side of the second continuous regeneration type DPF 13', but works to simply open and close the communication passage 21. In FIG. 3A, the control valve 26 is open, opening the communication passage 21. The passage of the second continuous regeneration type DPF 13' has a larger flow resistance than that of the by-path 20, and, hence, the exhaust gas flows chiefly through the by-path 20. However, the exhaust pipe section 7a is also communicated with the second continuous regeneration type DPF 13', and the exhaust gas flows therein to some extent.

Figure 3B:
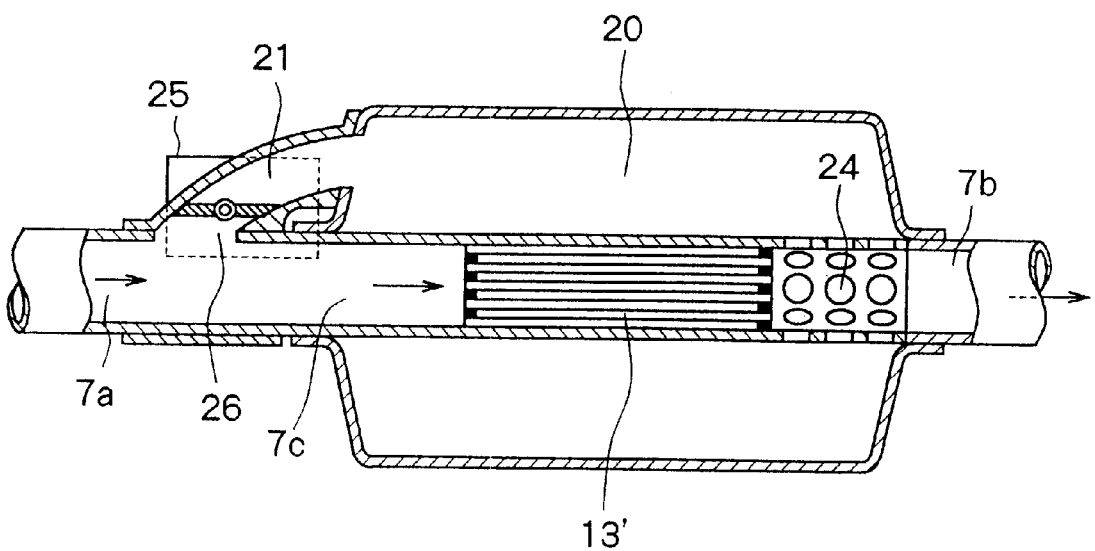

In FIG. 3B, the communication passage 21 is closed by the control valve 26, and the exhaust gas does not flow through the by-path 20. In this case, the whole exhaust gas flows into the second continuous regeneration type DPF 13' through the exhaust pipe section 7c, like the one shown in FIG. 2(*b*).

Reverting to FIG. 1, the illustrated diesel engine has an engine rotational speed sensor 15 for detecting the rotational speed of the engine, an accelerator sensor 16 for detecting the accelerator pedal depression amount (ACL), an intake air temperature sensor 17 arranged in the intake manifold 3 for detecting the temperature of the air taken in by the cylinder, and a control means 10 for controlling the EGR valve 11 and the amount of fuel injected into the cylinder by using a fuel injector, that is not shown, in response to detection signals from the engine rotational speed sensor 15, accelerator sensor 16 and intake air temperature sensor 17. The control means 10 has a memory storing a so-called fuel injection amount map (not shown) in which the amounts of fuel injection are set by using the engine rotational speed and the accelerator pedal depression amount as parameters, and the basic amount of fuel injection is determined based on the detection signals from the engine rotational speed sensor 15 and the accelerator sensor 16. Further, the control means 10 corrects the basic amount of fuel injection based on a value detected by the intake air temperature sensor 17 to determine a final amount of fuel injection. The final amount of fuel injection can be corrected at any time based not only on the temperature of the intake air but also on any other parameter (such as atmospheric pressure, smoke-limit injection amount, etc.).

The diesel engine that is illustrated is equipped with an intake air shutter 18 for limiting the amount of the intake air, in the intake pipe 5 that constitutes part of the intake air passage, arranged on the upstream side of the portion where the EGR passage 9 is linked. The intake air shutter 18 is usually maintained fully opened. Further, an exhaust gas shutter 19 for limiting the flow-out of the exhaust gas is arranged in the exhaust pipe 7 that constitutes part of the exhaust gas passage on the downstream side of the portion where the EGR passage 9 is linked. The exhaust gas shutter 19, too, is maintained fully opened in a normal state, like the intake air shutter 18. The intake air shutter 18 and the exhaust gas shutter 19 are equipped with, for example, negative pressure actuators connected to a negative pressure tank, that is not shown, and are controlled for their opening degrees by controlling the amount of negative pressure fed thereto by the control means 10 according to the operation conditions.

Figure 4:
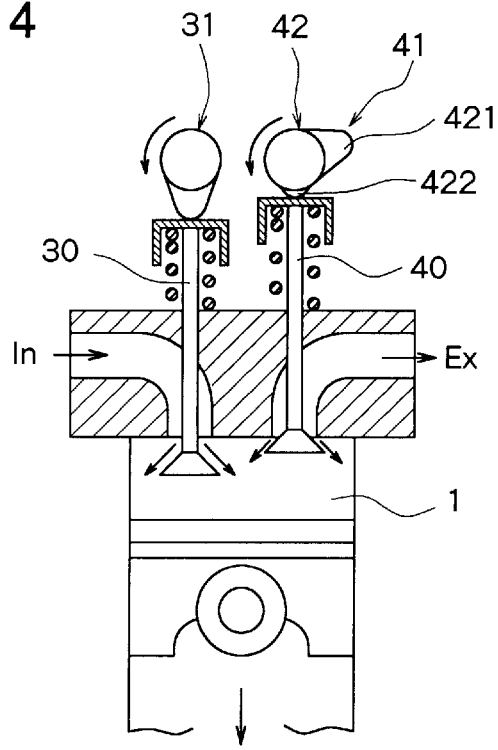
FIG. 4 is a sectional view illustrating an embodiment of an exhaust gas introduction mechanism according to the present invention.

The diesel engine according to the present invention is equipped with an exhaust gas introduction mechanism for opening the exhaust gas passage of the cylinder 1 during the intake stroke as shown in FIG. 4. FIG. 4 illustrates an intake valve 30, an intake valve operation mechanism 31, an exhaust valve 40 and an exhaust valve operation mechanism 41. An exhaust cam 42, that constitutes the exhaust valve operation mechanism 41, has a normal cam profile 421 for operating the exhaust valve 40 in the exhaust stroke and an exhaust gas introduction cam profile 422 formed at a phase angle of about 90° on the back side of the cam profile 421 viewed from the direction of rotation. The thus constituted exhaust cam 42 operates the exhaust valve 40 in compliance with an exhaust valve lift curve based on the cam profile 421 and in compliance with an exhaust valve lift curve based on the exhaust gas introduction cam profile 422 for a short period of time during the intake stroke (during the intake valve lift curve based on the intake valve operation mechanism 31). In this embodiment, therefore, the exhaust gas introduction cam profile 422 formed on the exhaust cam 42 works as an exhaust gas introduction mechanism for introducing the exhaust gas into the cylinder 1 during the intake stroke. The amount of movement the exhaust valve 40 by the exhaust gas introduction cam profile 422 may be from about 1 mm to about 3 mm.

Described below is how to control the device for purifying exhaust gas of the diesel engines having the second continuous regeneration type DPF 13 as described above.

The embodiment shown in FIG. 1, is equipped with exhaust gas temperature region detector means for detecting the exhaust gas temperature region of the diesel engine. The exhaust gas temperature region detector means will now be described.

Figure 5:
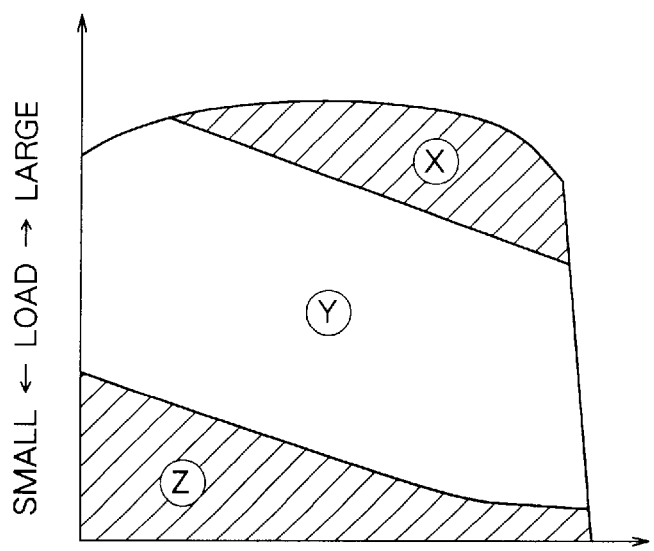
FIG. 5 is a map of the exhaust gas temperature regions.

The exhaust gas temperature of the engine is determined chiefly by the fuel injection amount (load) supplied to the engine and the engine rotational speed. The control means 10 in the device for purifying exhaust gas according to the illustrated embodiment has an internal memory (not shown) which stores a map of exhaust gas temperature regions using the engine rotational speed and the engine load as parameters, as shown in FIG. 5, and detects in what region the exhaust gas temperature now lies from the engine rotational speed and the fuel injection amount (load). The region referred to here stands for a temperature region of the exhaust gas emitted from the cylinders.

The regions X, Y and Z shown in FIG. 5 are set by making reference to chiefly the test results of the exhaust gas temperatures of the engine and to the active temperature region of the oxidizing catalyst 121 at the time of defining the map. The region X is a region higher than the active temperature region of the oxidizing catalyst 121 in the first continuous regeneration type DPF 12 according to the embodiment, and it is desired to lower the exhaust gas temperature in this region. The region Y is included in the active temperature region of the oxidizing catalyst 121 in the first continuously reproducing DPF 12, and the region Z is a region where the exhaust gas temperature is lower than the active temperature region of the oxidizing catalyst 121 of the first continuous regeneration type DPF 12.

The boundary lines on the map are set by taking account of a drop in the exhaust gas temperature before it arrives at the oxidizing catalyst 121 in the first continuous regeneration type DPF 12 from the exhaust gas manifold. The boundary lines may further be set by taking the flow rate of the exhaust gas into consideration, since the distribution of exhaust gas temperatures in the continuous regeneration type DPF are also affected by the flow rate of the exhaust gas.

Figure 6:
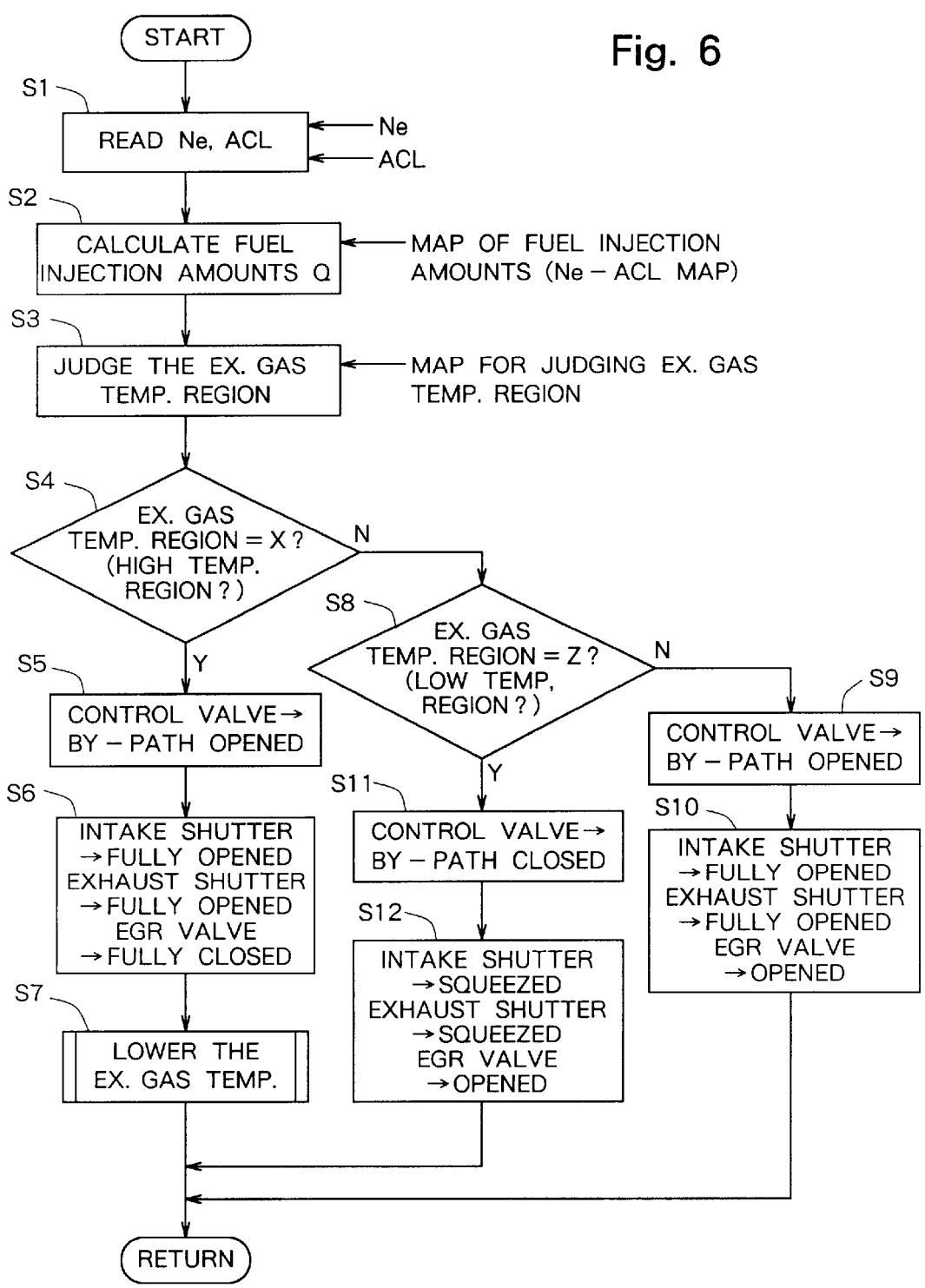
FIG. 6 is a flowchart illustrating the control operation of the control means in the present invention.

Next, the operation of the device for purifying exhaust gas according to the embodiment of the second continuous regeneration type DPF shown in FIG. 2 utilized in the diesel engine system of FIG. 1 will be described with reference to a the flowchart of FIG. 6. When the engine starts operating, fuel is supplied to the engine by a fuel injection device that is not shown. The control means 10 reads an engine rotational speed signal (Ne) and an accelerator pedal depression amount (ACL) from the engine rotational speed sensor 15 and the accelerator sensor 16 (step S1), and makes reference to the fuel injection amount map (not shown) to determine the amount of fuel injection (step S2). The control means 10 detects the amount of fuel injection at this moment as the engine load Q.

In the device for purifying exhaust gas of the embodiment shown in FIG. 1, when the engine load Q is detected as described above, the control means 10 detects the present exhaust gas temperature region from the map of exhaust gas temperature regions shown in FIG. 5 based on the engine load and the engine rotational speed that has been detected (step S3). When the present exhaust gas temperature region has been detected, the control means 10 controls the EGR valve 11, the intake air shutter 18 and the exhaust gas shutter 19 based on the present exhaust gas temperature region, and controls the control valve.

First, when the exhaust gas temperature is determined to be in the region X higher than the active temperature of the oxidizing catalyst 12, in the first continuous regeneration type DPF (step S4), the control means 10 controls the control valve 22 so as to open the communication passage 21 and to close the exhaust pipe section 7c on the side of the second continuous regeneration type DPF 13 (step S5). Therefore, the whole exhaust gas passes through the by-path 20. The control means 10 fully closes the EGR valve 11 and fully opens the intake air shutter 18 and the exhaust gas shutter 19 (step S6). The control means 10 then executes the control operation to lower the exhaust gas temperature (step S7). The control operation for lowering the exhaust gas temperature is done, for example, by increasing the amount of the intake air by using a variable turbo charger or by cooling the exhaust gas by using cooling water. The control operation for lowering the exhaust gas temperature is not a chief constituent element of the present invention and hence, is not described here. The control operation for lowering the exhaust gas temperature may be omitted when the catalyst works even in a high-temperature region.

When the exhaust gas temperature region is not region X at step S4, the control means 10 proceeds from step S4 to step S8 where it judges whether the exhaust gas temperature region is the low temperature region Z lower than a predetermined temperature (activating temperature of the oxidizing catalyst 121 in the first continuous regeneration type DPF). When it is judged that the exhaust gas temperature is not in the low temperature region Y, the control means 10 proceeds to step S9 where it controls the control valve 22 so as to open the communication passage 21 and to close the exhaust pipe section 7c on the side of the second continuous regeneration type DPF 13, like in the case of the exhaust gas temperature region X. The control means 10, then, proceeds to step 10 to fully open the intake air shutter 18 and the exhaust gas shutter 19, and to open the EGR valve 11. At this moment, the control means 10 may execute the EGR control operation based on the load and the engine rotational speed in the normal operation.

When it is judged at step S8 that the exhaust gas temperature region is the low temperature region Z lower than the predetermined temperature (activating temperature region of the oxidizing catalyst 121 in the first continuous regeneration type DPF), the control means 10 proceeds to step S11 to control the control valve 22 so as to close the communication passage 21 communicated with the by-path, thereby to close the by-path 20, so that the whole exhaust gas flows through the second continuous regeneration type DPF only. The control means 10 then proceeds to step S12 to operate the intake air shutter 18 and the exhaust gas shutter 19 to conduct squeezing control. By squeezing the intake air shutter and the exhaust gas shutter, the amount of air in the cylinder is decreased in cooperation with the exhaust gas introduction mechanism, whereby the exhaust gas temperature is raised. At the same time, the control means 10 opens the EGR valve 11.

After having executed the above control operation, the control flowchart returns to the start.

As for the second continuous regeneration type DPF, in the case where there is used a type of DPF having an upper limit of the reaction temperature in the oxidizing reaction of the catalyst for removing PMs, it is desired that the control valve 22 is so constituted as to completely close the exhaust pipe section 7c communicated with the second continuous regeneration type DPF in the temperature region (high-temperature region) where the oxidizing reaction hardly takes place, as shown in the embodiment of FIGS. 2A and 2B.

Further, when there is used a catalyst which works even in the high-temperature region and has no upper limit on the reaction temperature, it is desired that the control valve is so constituted as to cause the exhaust gas to flow into the second continuous regeneration type DPF without closing the exhaust pipe section 7c even in a state where the by-path 20 is opened, as shown in the embodiment of FIGS. 3A and 3B. The control valve 26 may open and close the communication passage 21 under quite the same conditions as those of the control valve 22. According to the embodiment shown in FIGS. 3A and 3B, in the high-temperature region, most of the exhaust gas flows through the by-path 21 while some of the exhaust gas flows into the second continuous regeneration type DPF and the PMs remaining on the filter are burned and removed. Besides, the burned gas flows to the downstream section 7b of the exhaust pipe. It is therefore possible to maintain the second continuous regeneration type DPF in a fresh state even when the second continuous regeneration type DPF is not used.

In the embodiments shown in FIGS. 2A and 2B and FIGS. 3A and 3B, the control valve is positioned on the upstream side of the second continuous regeneration type DPF. It is, however, also possible to arrange the communication passage and the control valve on the downstream side of the by-path. Namely, the constitutions of the by-path, communication passage and control valve may be arranged front side back except the second continuous regeneration type DPF. In the embodiment of the invention, further, the control valves were formed in two ways (FIGS. 2A and 2B and FIGS. 3A and 3B). Not being limited thereto only, however, a open/close or change-over valve of any form of system may be used, provided that it limits the flow into the by-path which is provided so as to surround the periphery of the second continuous regeneration type DPF.

According to the constitution of the present invention as described above, the second continuous regeneration type DPF arranged on the upstream side of the exhaust gas passage is so controlled as to be used in a region where the exhaust gas has a low temperature (region Z in the map of FIG. 5). In the exhaust gas temperature regions (regions X and Y in the map of FIG. 5) where even without using the second continuous regeneration type DPF, the PMs are favorably trapped by the first continuous regeneration type DPF and the DPF is continuously regenerated, the exhaust gas is allowed to flow chiefly through the by-path surrounding the outer peripheral portion of the second continuous regeneration type DPF. Owing to this constitution, the second continuous regeneration type DPF is heated always even when it is not in use, by the exhaust gas flowing through the outer periphery thereof. Therefore, the PMs in the filter are completely burned and removed (PMs are burned at not lower than 600° C.) and, at the same time, the second continuous regeneration type DPF is maintained heated at all times. Therefore, when the second continuous regeneration type DPF is used by the passage being changed over by the control valve, the exhaust gas is not cooled and hence, the reaction of the catalyst does not lower. Accordingly, the PMs can be trapped and burned.

I claim:

1. A device for purifying exhaust gas of diesel engines, said device comprising:

a first continuous regeneration type diesel particulate filter disposed in the exhaust gas passage of the diesel engine;

a second continuous regeneration type diesel particulate filter having a capacity smaller than the capacity of said first continuous regeneration type diesel particulate filter and disposed in the exhaust gas passage of the diesel engine on the upstream side of said first continuous regeneration type diesel particulate filter;

a by-path surrounding the outer peripheral portion of said second continuous regeneration type diesel particulate filter;

a control valve for opening and closing said by-path;

exhaust gas temperature region-detecting means for detecting the exhaust gas temperature region of the diesel engine; and control means for controlling said control valve so as to close the by-path when the exhaust gas temperature region of the diesel engine, as detected by said exhaust gas temperature region-detecting means, is in a low temperature regions, lower than a predetermined temperature.

2. A device as claimed in claim 1, wherein said second continuous regeneration type diesel particulate filter has an inlet; and wherein when the exhaust gas temperature region of the diesel engine, as detected by said exhaust gas temperature region detecting means, is outside the low temperature region, said control means controls said control valve so as to close said inlet of said second continuous regeneration type diesel particulate filter.

* * * * *